United States Patent [19]

Heath et al.

[11] Patent Number: 5,207,957
[45] Date of Patent: May 4, 1993

[54] METHOD FOR PRODUCING A FOAMED PANEL

[75] Inventors: Gerald A. Heath, Canton; Richard L. Hamilton, Novi; Steven D. McCarthy, Farmington Hills, all of Mich.

[73] Assignee: Ford Motor Company, Dearborn, Mich.

[21] Appl. No.: 742,113

[22] Filed: Aug. 8, 1991

[51] Int. Cl.⁵ .................. B29C 45/14; B29C 67/22
[52] U.S. Cl. .................. 264/40.5; 264/46.5; 264/46.8; 264/261; 264/516; 264/572
[58] Field of Search ............... 264/500, 261, 510, 512, 264/516, 40.5, 46.6, 46.7, 46.5, 46.8, 267, 46.4, 572

[56] References Cited

U.S. PATENT DOCUMENTS

| | | |
|---|---|---|
| 3,265,783 | 8/1966 | Jacobs . |
| 3,629,030 | 12/1971 | Ash .................. 264/512 |
| 3,801,244 | 4/1974 | Eisenberg . |
| 3,993,421 | 11/1976 | Adair . |
| 4,155,967 | 5/1979 | South et al. .......... 264/512 |
| 4,208,365 | 6/1980 | Lefevre . |
| 4,303,728 | 12/1981 | Houdek et al. . |
| 4,318,874 | 3/1982 | Lemelson . |
| 4,420,447 | 12/1983 | Nakashima . |
| 4,424,180 | 1/1984 | Lalloz et al. . |
| 4,473,215 | 9/1984 | Rathfon, II et al. . |
| 4,575,447 | 3/1986 | Hariguchi ............ 264/512 |
| 4,634,565 | 1/1987 | Irrgang ............... 264/516 |
| 4,765,935 | 8/1988 | Fiorentini ............ 264/40.5 |
| 4,791,019 | 12/1988 | Ohta et al. . |
| 4,806,293 | 2/1989 | Akiyama et al. . |
| 4,844,847 | 7/1989 | Harada . |
| 4,847,024 | 7/1989 | Loren ................ 264/46.6 |
| 4,968,474 | 11/1990 | Ito ................... 264/516 |

FOREIGN PATENT DOCUMENTS

| | | | |
|---|---|---|---|
| 2106546 | 8/1972 | Fed. Rep. of Germany | 264/46.6 |
| 54-058769 | 5/1979 | Japan | 264/46.5 |
| 56-118830 | 9/1981 | Japan | 264/46.5 |
| 57-059731 | 4/1982 | Japan | 264/46.5 |
| 59-026477 | 2/1984 | Japan | 264/46.5 |
| 2100175 | 12/1982 | United Kingdom | 264/500 |

Primary Examiner—Allan R. Kuhns
Attorney, Agent, or Firm—Damian Porcari; Clifford L. Sadler

[57] ABSTRACT

A method of manufacturing an article having a substructure with a wall having first and second wall surfaces and a molded layer along the first wall surface. The substructure is supported in a tool having first and second die surfaces on either side of the wall. The first die surface is spaced apart from the first wall surface and the second die surface is spaced apart from the second wall surface. A moldable material is injected between the first die surface and the first wall surface under conditions causing said material to exert a force on the wall. The second wall surface is contacted with a fluid under sufficient pressure to create a force on the wall that offsets the force exerted by the material whereby the wall is supported against deformation.

9 Claims, 3 Drawing Sheets

METHOD FOR PRODUCING A FOAMED PANEL

FIELD OF THE INVENTION

This invention relates to the manufacture of a foamed panel. More specifically, this invention relates to a method of manufacturing a foamed panel having a rigid substructure which is not completely supported by a die or other tool.

BACKGROUND OF THE INVENTION

The invention relates to a method of manufacturing foamed panels, specifically panels having a rigid substructure and a foam layer. In the preferred embodiment of the invention, the foam is covered by a finishing layer. Foamed panels are useful in many applications, including lining the interior of automobiles. A rigid panel, generally made of a plastic or a woodstock base material, is provided with a covering. The covering may be a vinyl sheet or other formable material. To provide an attractive appearance, foam material is placed between the rigid substructure and the covering. Various components are often placed adjacent the substructure, which components have a hollow or partially hollow cross-section. Automotive instrument panels, for example, have reinforcement beams or ducts placed adjacent the panel. It is desirable to integrally mold the substructure with these beams or ducts. However, using conventional manufacturing techniques, the substructure cannot be completely supported by the mold die, and the pressure from the foaming operation deforms the unsupported sections of the panel.

A method for producing a close-mold foamed composite panel is shown and described in U.S. Pat. No. 4,303,728, issued to Houdek et al, Dec. 1, 1981. Houdek et al teaches a method of producing a foamed composite panel, which does not have hollow or partially hollow sections, by placing a finishing layer in the cavity of a first die. A rigid substructure is overlaid the finishing layer and spaced apart therefrom. A second die is overlaid the rigid substructure. The first and second dies are brought together and a space is maintained between the sheet and rigid substructure. A foaming material is injected within the space and allowed to cure. The second die generally completely supports the rigid substructure and prevents deflection of the substructure during the foaming. Expansion of the foam is limited to the space defined between the rigid substructure and sheet. The second die prevents deflection of the rigid substructure by the expanding foam. Deflection of the rigid substructure would cause an increase in the space and thickness of the foam. Houdek et al teaches a second die having an interior surface conforming generally to a rigid substructure. The rigid substructure is nearly completely supported by the second die during the foaming process.

It is desirable in some applications, such as automotive instrument panels, to produce a rigid substructure having hollow or partially hollow sections for the ventilating ducts, support brackets, reinforcement ribbing and the like. These hollow and partially hollow sections prevent completely supporting the rigid substructure by the die during the foaming process. When the rigid substructure is not completely supported by the die, deflection of the rigid substructure by the expanding foam occurs and produces a finished article having an irregular surface finish.

U.S. Pat. No. 4,791,019, issued Dec. 13, 1988, to Ohta et al, teaches a foamed interior panel which does not include a rigid substructure. Glass fibers are added to the foam material to create a semirigid polyurethane foam layer. The urethane foam eliminates the need for a rigid panel. Ohta et al does not teach molding an instrument Panel having integral ducts which are used to support the foamed layer.

U.S. Pat. No. 4,806,293, issued Feb. 21, 1989, to Akiyama et al, teaches a method of producing a molded article from a foamed thermoplastic material. Akiyama et al teaches injecting a thermoplastic resin in a mold cavity. The resin begins to foam and causes the expansion of the article in the mold cavity. The dies are operable to control compression pressure of the foamed article during the mold process. Akiyama et al does not teach foaming a space adjacent a rigid substructure and maintaining the pressure in the space to avoid deflection of the rigid substructure. The foamed article in Akiyama et al is not integrally molded onto a sheet member or a rigid substructure.

It is an object of the present invention to provide a method of manufacturing a foamed article having a rigid substructure which is not completely supported by a die.

It is a further object of the present invention to provide a method of making a molded article on a rigid substructure which is not supported by a die.

It is a further object of the present invention to produce a foamed instrument panel having integrally molded ducts.

SUMMARY OF THE INVENTION

The present invention provides a method of manufacturing an article having a substructure with a wall having first and second wall surfaces and a molded layer along the first wall surface, comprising the steps of: supporting the substructure in a tool having first and second die surfaces on either side of the wall, the first die surface being spaced apart from the first wall surface and the second die surface being spaced apart from the second wall surface; injecting a moldable material between the first die surface and the first wall surface under conditions causing said material to exert a force on the wall; and contacting the second wall surface with a fluid under sufficient pressure to create a force on the wall that offsets the force exerted by the material whereby the wall is supported against deformation.

The foaming reaction increases the temperature and pressure within the space between the first die surface and first wall surface. Because only one surface of the rigid substructure is supported by the second die, the unsupported interior surface of the rigid substructure is prone to deflection when subjected to increased pressure from within the space. To avoid this deflection, the pressure which contacts the second wall surface is increased. A hollow member adjacent the substructure or the space between the second wall surface and second die surface forms a chamber. The pressure within this chamber is variable and applies a force on the second wall surface. The increased pressure within the chamber supports the rigid substructure from being deflected by the increased foam pressure within the space. By maintaining the pressure within the chamber to approximately equal the pressure within the space, deflection of the rigid substructure is thereby avoided.

The methods of the present invention permit the use of close-mold foaming for articles having rigid substructures which are not completely supported by a mold die. Rigid substructures which include a hollow section are useful for applications such as automotive instrument panels or door trim panels having reinforcement beams. The hollow section may comprise ducts and conduits integral with the rigid panel. The partially hollow section may also include a section of a panel which has reinforcing ribs projecting away from the foam. These ribs do not completely enclose an area, but make completely supporting the substrate with a die difficult or impossible. In this case, the ribs are sealed by the second wall surface to form a fluid-tight chamber. These hollow and partially hollow sections permit the manufacture of a finished article having fewer pieces.

Rigid substructures which are manufactured by blow-molding or injection molding to include hollow sections such as integral ventilation ducts are generally not capable of being completely supported by a die. Integrally molding the ventilation ducts into the rigid substructure eliminates the need for add-on duct work. This simplifies the manufacturing and assembly of the completed instrument panel. Other instances where the rigid substructure may not be completely supported by a die include hollow sections adjacent reinforcement ribs or cut-out sections for supplemental restraint systems such as air bags.

Most automotive instrument panels are manufactured using a foaming process which causes an exothermic reaction in the foaming material. The exothermic reaction increases the temperature of the foaming material. The exothermic reaction also increases the pressure within the foaming material. This increased temperature and pressure is sufficient to cause the deflection of a rigid substructure made from a plastic material if the rigid substructure is not completely supported by a die. Deflection of the rigid substructure causes irregularities in the finished article. These irregularities may detract from the finished appearance of the article.

To avoid deflection of the rigid panel by the expanding foam, the present invention teaches increasing the pressure in a chamber adjacent one side of the rigid substructure to approximate the pressure of the foamed space on the other side of the substructure. The increased pressure on the chamber wall surface of the rigid substructure supports the rigid substructure from deflection that would otherwise result from the pressure of the expanding foam. The pressure within the chamber can be maintained to approximately equal that of the foam space.

The present invention provides a method of manufacturing a foamed article using a rigid substructure which has one or more hollow or partially hollow sections not completely supported by a mold or die. A foamed instrument panel having integrally molded ducts is capable of being manufactured using a close-mold foam process. The invention also provides a method of manufacturing a close-mold foamed panel having integral ventilating ducts and conduits made from a blow-molded material. The invention also permits the molding of instrument panels having relatively thin rigid substructures. By making the rigid substructure thinner, less material is used and the finished article is made lighter.

These and other objects, features and advantages of the present invention will become more apparent to one of ordinary skill in the art upon reference to the following drawings and description of the invention.

DETAILED DESCRIPTION OF PREFERRED EMBODIMENTS

Figure 1:
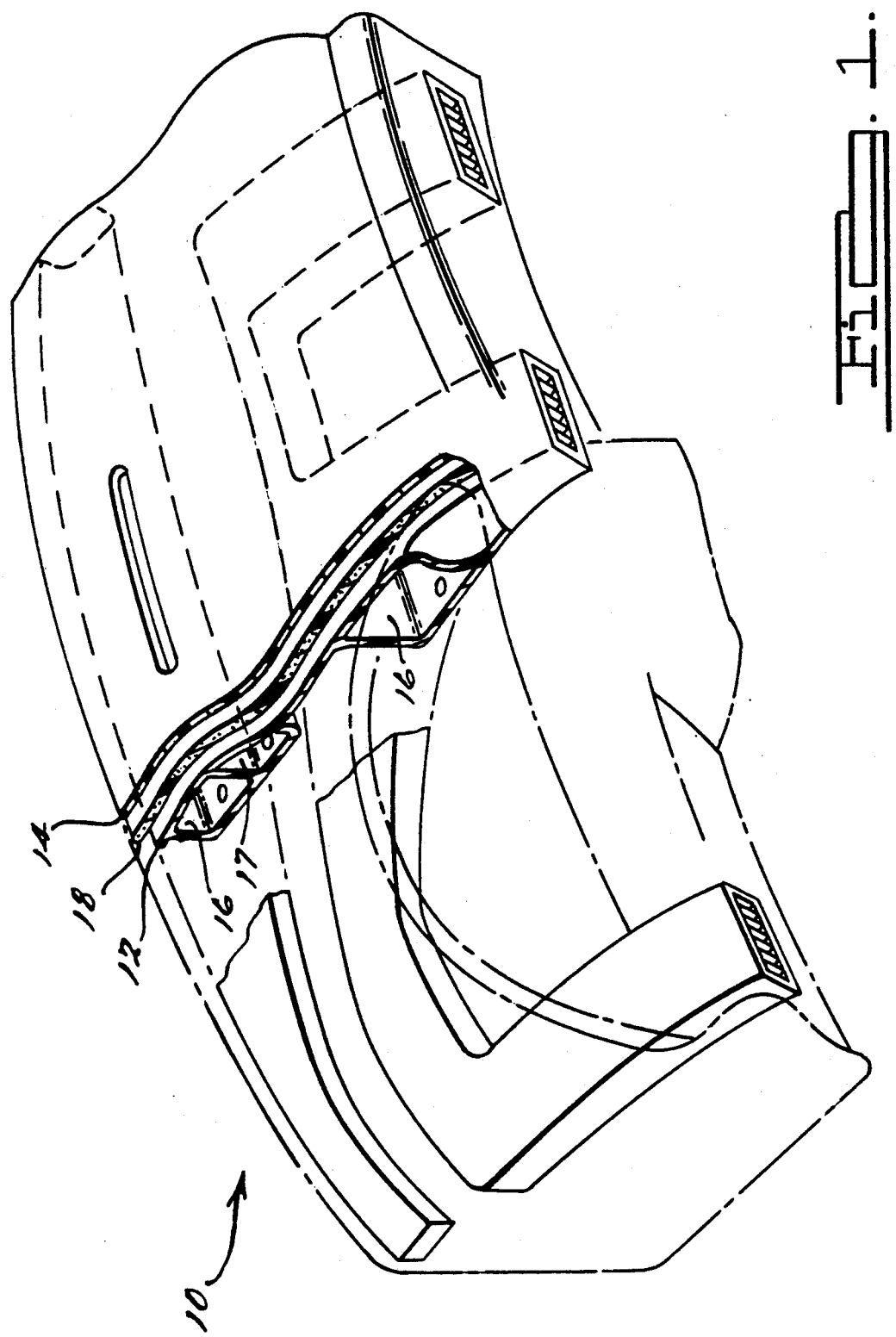
FIG. 1 is a perspective view partially broken away of a foamed instrument panel for an automobile having integrally molded ducts.

A preferred embodiment of the machine and method of manufacture of the present invention is described in the context of making an automotive instrument panel. An instrument panel 10 made in accordance with this invention is shown in FIG. 1. Instrument panel 10 comprises a rigid substructure 12, an elastomeric foam layer 18, and a finish layer 14. Rigid substructure 12 is manufactured by injection or blow-molding to include one or more hollow sections for integral ducts 16. These ducts may be for heating, cooling, ventilation, or defrosting. Ducts 16 generally run the length of instrument panel 10 and include openings along the face and top of the instrument panel. Ducts 16 communicate with the heat exchanger or condenser (not shown) for receiving conditioned air.

Additionally, rigid substructure 12 may include reinforcement members such as box beam 17 which is used to add strength to the instrument panel. Rigid substructure 12 may be manufactured from either a wood-based or plastic material. The plastic may be either a thermoplastic or a thermoset material and may be reinforced with fibers or metal. Specifically preferred for automotive type instrument panels are acryclonitrile-butadiene-styrene (ABS), styrene-maleic-anhydride (Dylark), and modified polyphenylene oxide (Noryl). Particularly preferred for blow-molding rigid substructures is Noryl, manufactured by General Electric. Particularly preferred for injection molding is Dylark material, manufactured by Arco Chemical.

Finish layer 14, generally made of a textured vinyl resin, covers instrument panel 10. Finish layer 14 may be preshaped or integrally molded onto instrument panel 10. Between finish layer 14 and rigid substructure 12 is the expanded foam material 18 manufactured from a polyurethane precursor. The materials and methods for manufacturing a closed mold foam panel are taught in U.S. Pat. No. 4,303,728 and are incorporated herein by reference.

Figure 2:
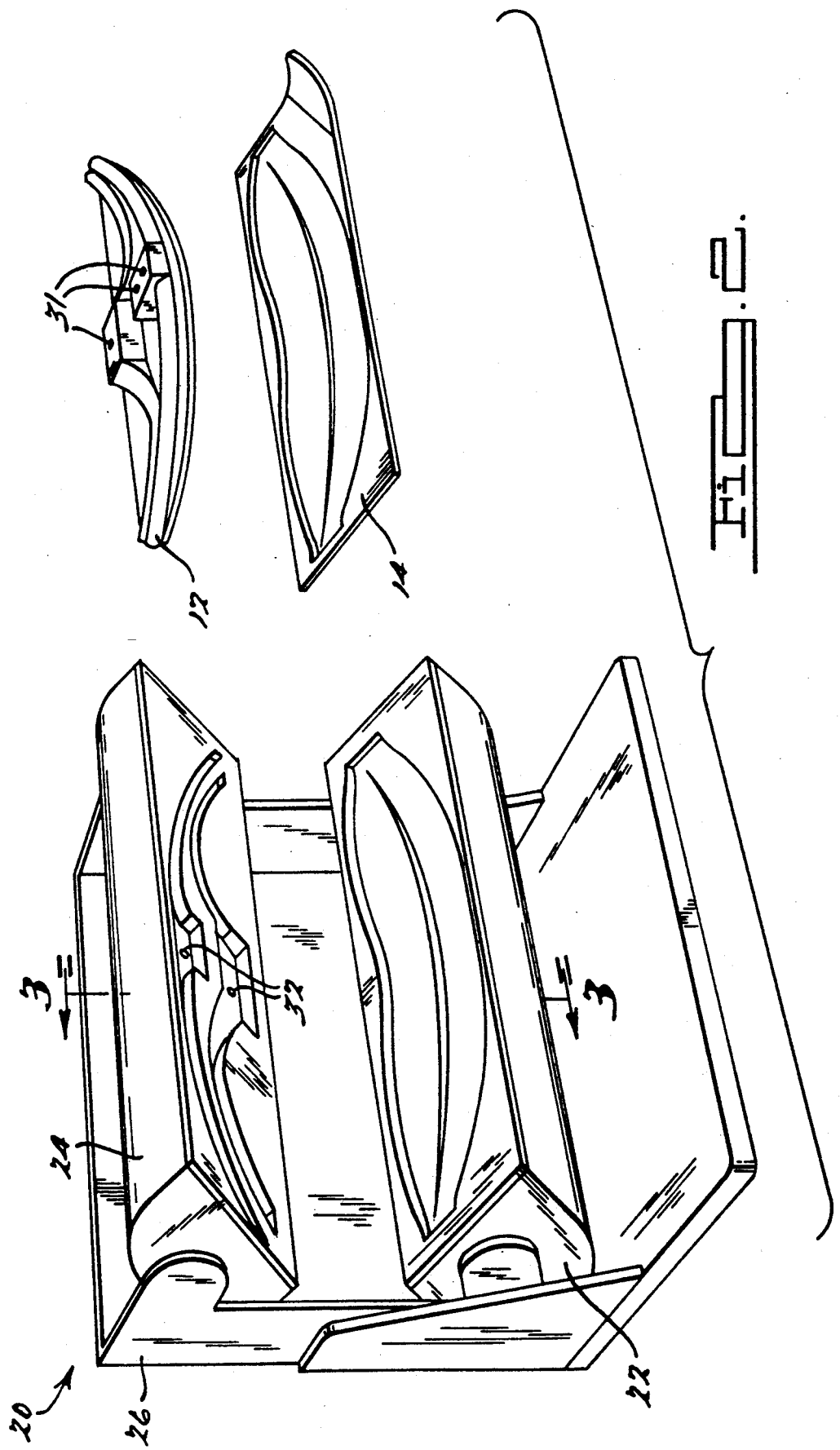
FIG. 2 is an exploded view of a mold and the relative positions of a rigid substructure, foam layer and finish layer for the instrument panel shown in FIG. 1.
Figure 3:
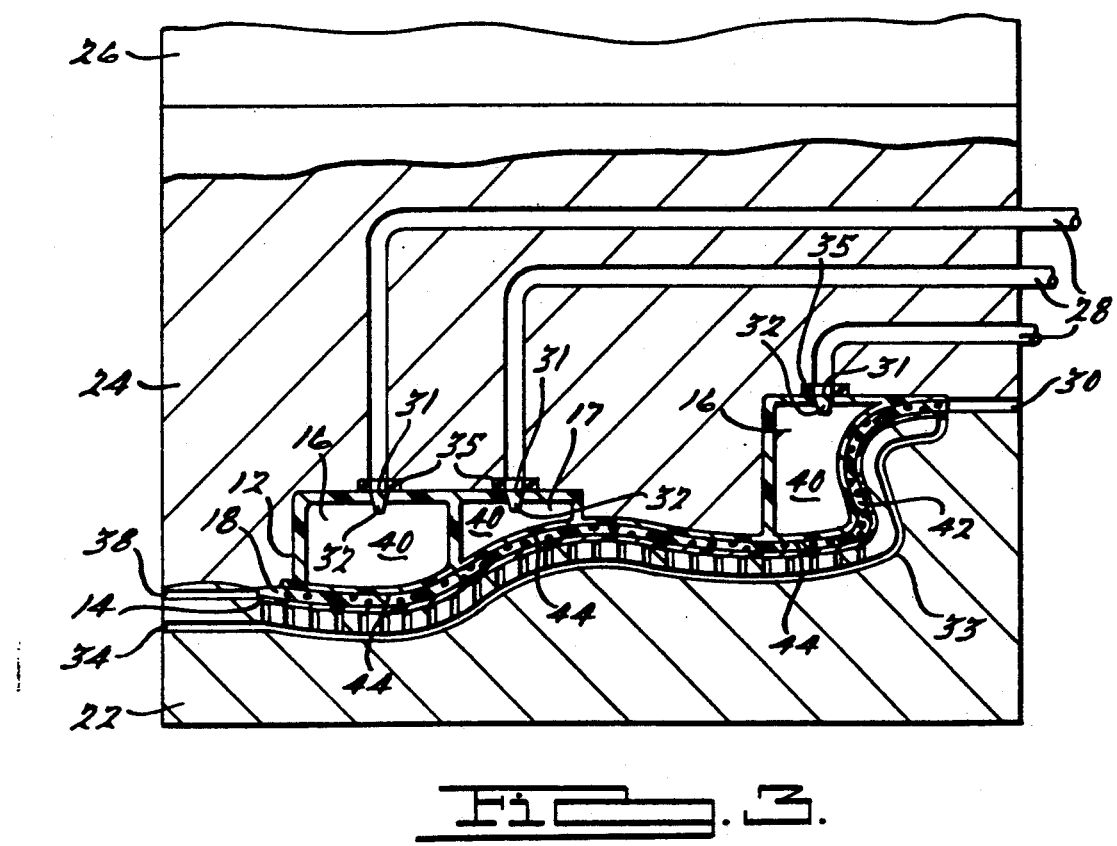
FIG. 3 is a sectional view taken along line III—III of FIG. 2 showing the mold in the closed position.

Alternatively, a moldable layer or coating, for example, a self-skinning foam, may be used in place of the finish layer 14. In this instance, the moldable material provides a finished appearance and adheres to rigid substructure 12. Molding tool 20, shown in FIGS. 2 and 3, is constructed to make instrument panel 10. It comprises hydraulic press 26 attached to second die 24 and first die 22. Second die 24 has an interior surface shaped to receive rigid substructure 12. First die 22 is stationary and has an interior surface shaped to receive finish layer 14. Rigid substructure 12 has been molded to include hollow sections that define integral ducts 16 and beam 17. Finish layer 14 has been premolded in the shape of instrument panel 10.

During manufacture of panel 10, finish layer 14 is placed within first die 22. First die 22 includes vacuum channels 33 which communicate with vacuum source 34, as shown in FIG. 3. Vacuum source 34 applies a vacuum to channels 33 and draws finish layer 14 against first die 22. Rigid substructure 12 is placed in first die 22, overlying the finish layer 14. A space 42 is maintained between rigid substructure 12 and finish layer 14. Foam injectors 30 are positioned between finish layer 14 and rigid substructure 12 for injecting a foam precursor within space 42.

When mold 20 closes, second die 24 overlies rigid substructure 12. Second die 24 defines hollow chambers 40 by sealing any openings in ducts 16 and beam 17 of rigid substructure 12. Pressure nozzles 32 in second die 24 register with apertures 31 in rigid substructure 12. Seals 35 about the perimeter of nozzles 32 seal against rigid substructure 12. Pressure nozzles 32 communicate with pressure source 28.

Press 26 closes dies 22,24 and applies a clamp pressure of approximately 25 tons. Vacuum source 34 applies a vacuum to channels 33 and draws finish layer 14 tightly against the inner surface of die 22. Die 22 may be optionally heated to increase the pliability of finish layer 14.

The hollow sections of rigid substructure 12, such as integral ducts 16 and box beam 17, define one or more hollow chambers 40. Hollow chambers 40 are generally air-tight when rigid substructure 12 is supported in mold 24 and may be pressurized above normal atmospheric pressure to about 15 psi. Rigid substructure 12 has chamber walls 44 having inner surfaces that define portions of chambers 40 and outer surfaces that are contacted by foam layer 18. Walls 44 are not directly supported by second die 24. The pressure within chamber 40 may be adjusted in response to pressure source 28.

Foam injector 30 communicates with space 42. A foam precursor is injected within space 42. The foam precursor used in the manufacture of automotive instrument panels is a mixture of polyol, manufactured by Olin Chemical Company, and isocyanate, manufactured by Dow Chemical Company. Vent 38 is open to allow air within space 42 to escape. After the foam precursor wets the surface of finish layer 14, vent 38 is closed. The precursor reacts to form polyurethane and $CO_2$ in an exothermic reaction.

Figure 4:
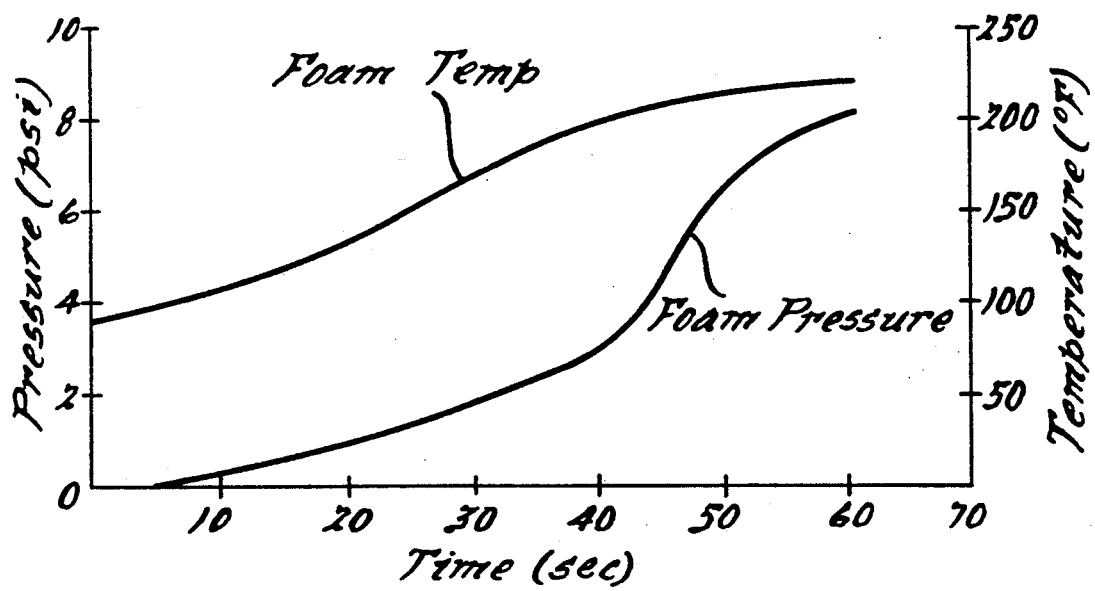
FIG. 4 is a graph of foam pressure and temperature plotted verses time.

Shown in FIG. 4 is a graph of pressure and temperature verses time for the exothermic foaming reaction between Polyol and isocyanate occurring within space 42. The pressure within space 42 increases from approximately zero psi to 9 psi and the temperature from 90° F. to 220° F. Pressure differences between space 42 and chambers 40 of 4 psi or greater tend to deflect walls 44 when using a rigid substructure having an unsupported span of 8 inches and a wall thickness of 0.125 inches. The pressure within chamber 40 is increased to avoid the deflection of walls 44 by the increased pressure within space 42. Chamber 40 is supplied with pressurized air from pressure source 28. Pressure source 28 injects sufficient pressurized air into chamber 40 to offset the pressure of the expanding foam and prevent deflection of walls 44. Increasing the pressure within chamber 40 increases the force applied to walls 44 and thus avoids deflection of rigid substructure 12 that would otherwise occur when the foam 18 expands during curing. A pressure transducer (not shown) within space 42 may be used to control pressure source 28 to maintain approximately equal pressure within space 42 and chamber 40.

The pressure within chamber 40 need not exactly equal that of space 42. The pressure within chamber 40 need only be increased an amount sufficient to avoid deflection of walls 44. Rigid substructure 12 does not deflect and the volume of space 42 remains relatively constant. Thinner walled or weaker substructures will required more nearly equal pressures whereas thicker walled or stronger substructures permit greater pressure differences between space 42 and chambers 40 before deflection.

During the period of increased pressure within chamber 40, foam 18 is permitted to cure. Foam 18 acts as a contact adhesive and adheres to finish layer 14 and rigid substructure 12. Foam 18 is placed in intimate contact with rigid substructure 12. No additional adhesives or fasteners are used to attach foam 18 to rigid substructure 12.

After foam 18 cures, the temperature and pressure within space 42 returns to approximately room condition. The pressure within chamber 40 is controlled to be proportionate to the pressure reduction within space 42. Thus, rigid substructure 12 is exposed to an approximately equal pressure on both surfaces of walls 44 during all phases of the foaming process. When the foaming process is completed, mold 20 opens dies 22,24 and finished instrument panel 10 is removed.

It is also possible to control the pressure within chambers 40 based upon the temperature of the foam within space 42. In this case, a temperature measuring device (not shown) measures the temperature of the foam. this foam temperature is related to foam pressure as described below. The counter-balancing pressure within chamber 40 may be adjusted in response to the foam temperature to avoid deflection of rigid substructure 12.

After a time/pressure relationship or temperature/pressure relationship has been established, as represented by the graph in FIG. 4, pressure monitoring within space 42 is not required. It is contemplated that each mold would be initially calibrated. In production, pressure measurement of space 42 would be eliminated and the pressure within chamber 40 adjusted according to the established time/pressure or temperature/pressure relationship. Most preferred is the use of the time/pressure relationship because no additional measuring need be performed within space 42.

Using the example illustrated in FIG. 4, pressure source 28 would apply little or no pressure for the 10-second period following foam injection. Pressure would be slightly increased from 10 to 20 seconds after foam injection and then significantly increased between 40 to 50 seconds. After the foam cures, chambers 40 would be vented to reduce the pressure to atmospheric and finished panel 10 would be removed from the mold 20.

The invention as described permits the close mold foaming of a panel where the rigid substructure surface is not completely supported by the mold die. The pressure within the foamed space does not excessively exceed the pressure adjacent the rigid substructure, therefore the rigid substructure is not deflected during the foaming and curing process. This pressure equalization is achieved by increasing the pressure of a chamber adjacent the foamed space.

The invention as described is suitable for use with thermoset as well as thermoformable rigid substructures. Integral ducts, conduits, and supports may be molded into the rigid substructure thereby reducing the number of components in a finished panel. The invention permits the use of thinner and less expensive plastic materials for rigid substructure 12 and increases the design flexibility of an instrument panel.

The invention has been described in terms of an automobile instrument panel. However, the method of the present invention may be adapted to form other molded articles for both automotive and nonautomotive applications. It is understood that various modifications of the preferred embodiments can be used. For example, the teachings of the present invention are applicable for the manufacture of door trims, glove box doors, trunk liners, and other panels where continuous support of the rigid substructure by a die is difficult or impractical. It is understood by those skilled in the art in view of the present disclosure that various changes and modifications may be made without departing from the scope of the invention. Claims appended hereto are intended to cover all such changes and modifications.

We claim:

1. A method of manufacturing an article having a substructure with a wall having first and second wall surfaces and a molded layer along said first wall surface, comprising the following steps:
   supporting said substructure in a tool having first and second die surfaces on either side of said wall, said first die surface being spaced apart from said first wall surface and said second die surface being spaced apart from said second wall surface;
   injecting a moldable material between said first die surface and said first wall surface under conditions causing said material to apply a varying pressure against said first wall surface between the time said moldable material is first injected to a time thereafter; and
   contacting said second wall surface with a fluid under sufficient pressure to create a force on said wall that offsets the pressure exerted by said material and changing the pressure of said fluid in accordance with a predetermined time/pressure relationship, whereby said wall is supported against deformation.

2. The method of claim 1, wherein said fluid is air.

3. The method of claim 1, wherein said article is an automotive instrument panel.

4. The method of claim 1, further comprising the steps of:
   measuring the temperature of said moldable material after said injecting step; and
   changing the pressure of said fluid in accordance with a predetermined temperature/pressure relationship.

5. A method of manufacturing an article having a substructure with a wall having first and second wall surfaces, a molded layer along said first wall surface, and a finishing layer, comprising the following steps:
   supporting said substructure in a tool having first and second die surfaces on either side of said wall, said first die surface being spaced apart from said first wall surface and said second die surface being spaced apart from said second wall surface;
   supporting said finishing layer on said first die surface with said finishing layer being spaced apart from said first wall surface;
   injecting an expandable foamable material into the space between said first wall surface and said finishing layer under conditions causing said foamable material to exert a force on said wall; and
   contacting said second wall surface with a fluid under sufficient pressure to create a force on said wall that offsets the force exerted by said material whereby said wall is supported against deformation.

6. The method of claim 5, wherein said finishing layer is a flexible sheet retained adjacent said first die surface by vacuum.

7. The method of claim 5, wherein said second die surface contains passages communicating with a variable fluid pressure source, and further comprising the steps of:
   closing said tool and forming a fluid tight chamber between said second die surface and said second wall surface; and
   changing the pressure of said fluid in said chamber by varying the pressure applying said fluid pressure source.

8. The method of claim 7, wherein said changing step is in response to the force exerted on said wall by the injection of said foamable material.

9. A method of manufacturing an article having a rigid substructure with a hollow section, a finishing layer, and a molded foam layer therebetween, said section having and a wall with first and second wall surfaces, comprising the following steps:
   supporting said substructure in a tool having first and second die surfaces on either side of said wall, said first die surface being spaced apart from said first wall surface and said second die surface being spaced apart from said second wall surface;
   supporting said finishing layer on said first die surface with said finishing layer being spaced apart from said first wall surface;
   closing said tool and forming a fluid-tight chamber between said second die surface and said second wall surface;
   injecting an expandable foamable material into the space between said first wall surface and said finishing layer under conditions causing said foamable material to exert a force on said wall; and
   injecting a fluid into said chamber under sufficient pressure to create a force on said wall that offsets the force exerted by said material whereby said wall is supported against deformation.

* * * * *